United States Patent [19]

Arnaud

[11] 4,235,698
[45] Nov. 25, 1980

[54] ELECTRONIC WATER TREATMENT APPARATUS

[75] Inventor: Johnny Arnaud, Houston, Tex.

[73] Assignee: Hydrotreat, Inc., Houston, Tex.

[21] Appl. No.: 949,957

[22] Filed: Oct. 10, 1978

[51] Int. Cl.$^3$ .......................... C10G 33/02; B03C 5/00
[52] U.S. Cl. ................................ 204/302; 204/186
[58] Field of Search ........................ 204/302–308, 204/186–191

[56] References Cited

U.S. PATENT DOCUMENTS

| | | | |
|---|---|---|---|
| 2,207,583 | 7/1940 | Freeborn | 204/302 |
| 2,727,859 | 12/1955 | Freeborn | 204/302 |
| 2,864,750 | 12/1958 | Hughes, Jr. et al. | 204/149 |
| 3,202,601 | 8/1965 | Green | 204/302 |
| 3,342,720 | 9/1967 | Turner | 204/302 |
| 3,582,491 | 6/1971 | Louvar et al. | 204/186 |
| 3,758,399 | 9/1973 | Pendergrass | 204/228 |
| 3,766,050 | 10/1973 | Pados | 204/302 |
| 3,841,483 | 10/1974 | Overton | 210/87 |
| 3,843,507 | 10/1974 | Kwan | 204/302 |
| 3,915,817 | 10/1975 | Bennett | 204/95 |
| 3,970,536 | 7/1976 | Shettel | 204/180 R |
| 3,980,541 | 9/1976 | Aine | 204/186 |
| 4,001,102 | 1/1977 | Batha et al. | 204/186 |
| 4,073,712 | 2/1978 | Means et al. | 204/186 |

FOREIGN PATENT DOCUMENTS

| | | | |
|---|---|---|---|
| 463373 | 2/1950 | Canada | 204/302 |
| 568707 | 4/1945 | United Kingdom | 204/302 |
| 606154 | 8/1948 | United Kingdom | 204/302 |

OTHER PUBLICATIONS

Hydrotreat, HTI Hydrotreater Brochures, Hydrotreat, Inc. (no date).
Industrial and Engineering Chemistry, vol. 46, No. 5, May 1954, pp. 954–960.
J. Am. Water Works Assn., Oct. 1968, pp. 1371–1385.
J. Electrochem. Sol., vol. 100, p. 209C, Aug., 1953.
Water Conditioning, Jul., 1977, pp. 20, 21, 37.
Water Treatment, Eskel Nordell, 2nd Edition, 1961, pp. 270–273.

*Primary Examiner*—T. M. Tufariello
*Attorney, Agent, or Firm*—Arnold, White & Durkee

[57] ABSTRACT

Disclosed is an electronic fluid treatment device for use in circulating fluid systems for controlling and removal of scale materials. This device includes a series of electrodes in the form of parallel metal sheets. Alternate electrodes are oppositely charged by a low voltage DC power supply thereby generating an electric field between adjacent electrodes. By passing the fluid through this electric field, any mineral particles in the fluid are electrically modified thereby inhibiting crystal growth and agglomeration which results in scale deposits on the inner walls of circulating systems. The planar metal electrodes are directly exposed to the fluid with the planar configuration allowing maximum exposure to the electric field. The metal electrodes may be placed on a support so as to be parallel to the flow of the fluid or longitudinal therewith, using perforated, expanded, or screen mesh metal planar electrodes. The parallel plate electrode configuration may be utilized in both a pressure system by enclosing the parallel plates in a rectangular conduit or in an open circulating fluid system as for example a cooling tower basin.

34 Claims, 14 Drawing Figures

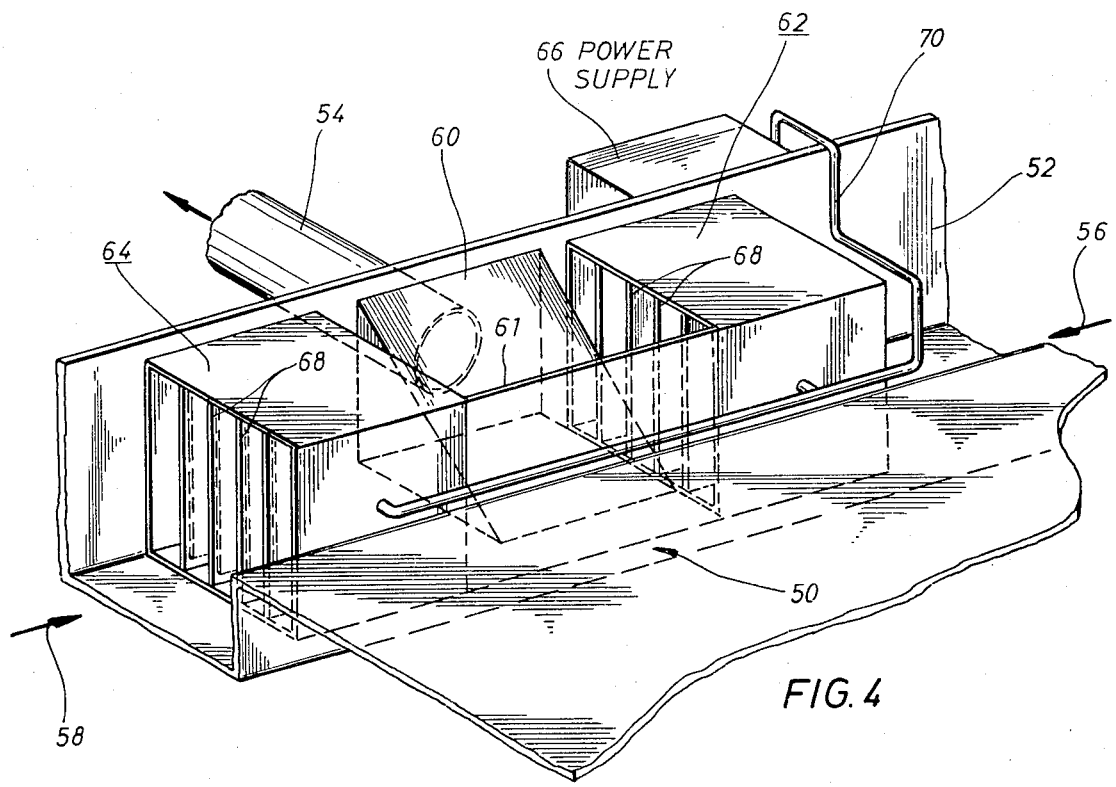
FIG. 4
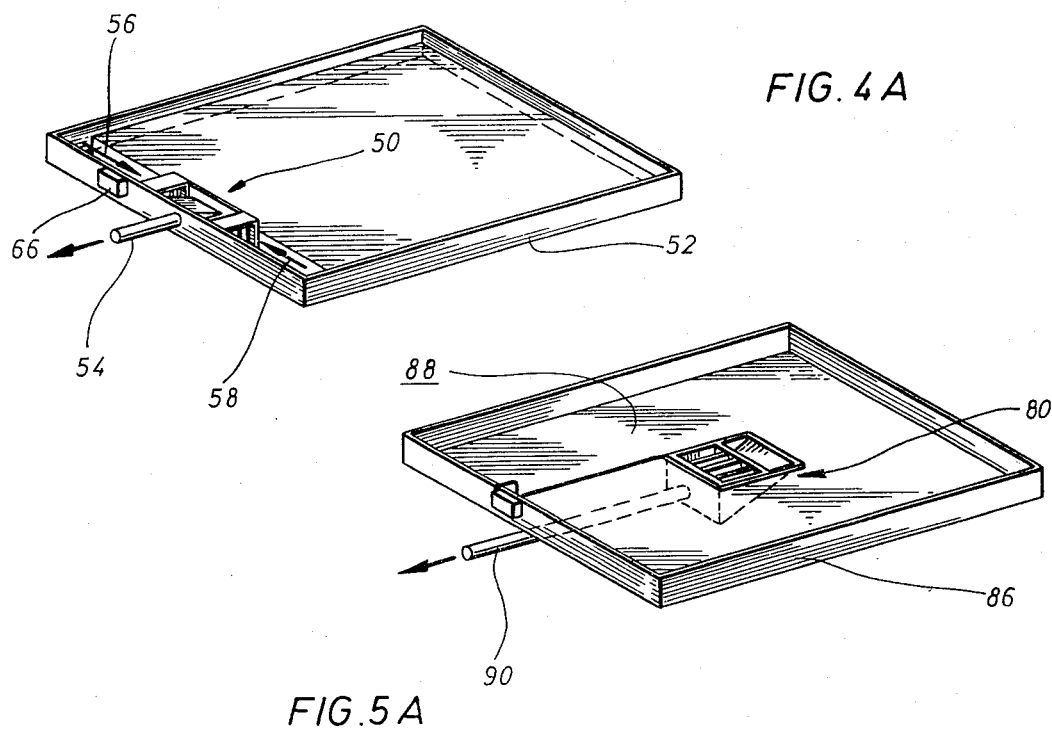
FIG. 4A
FIG. 5A

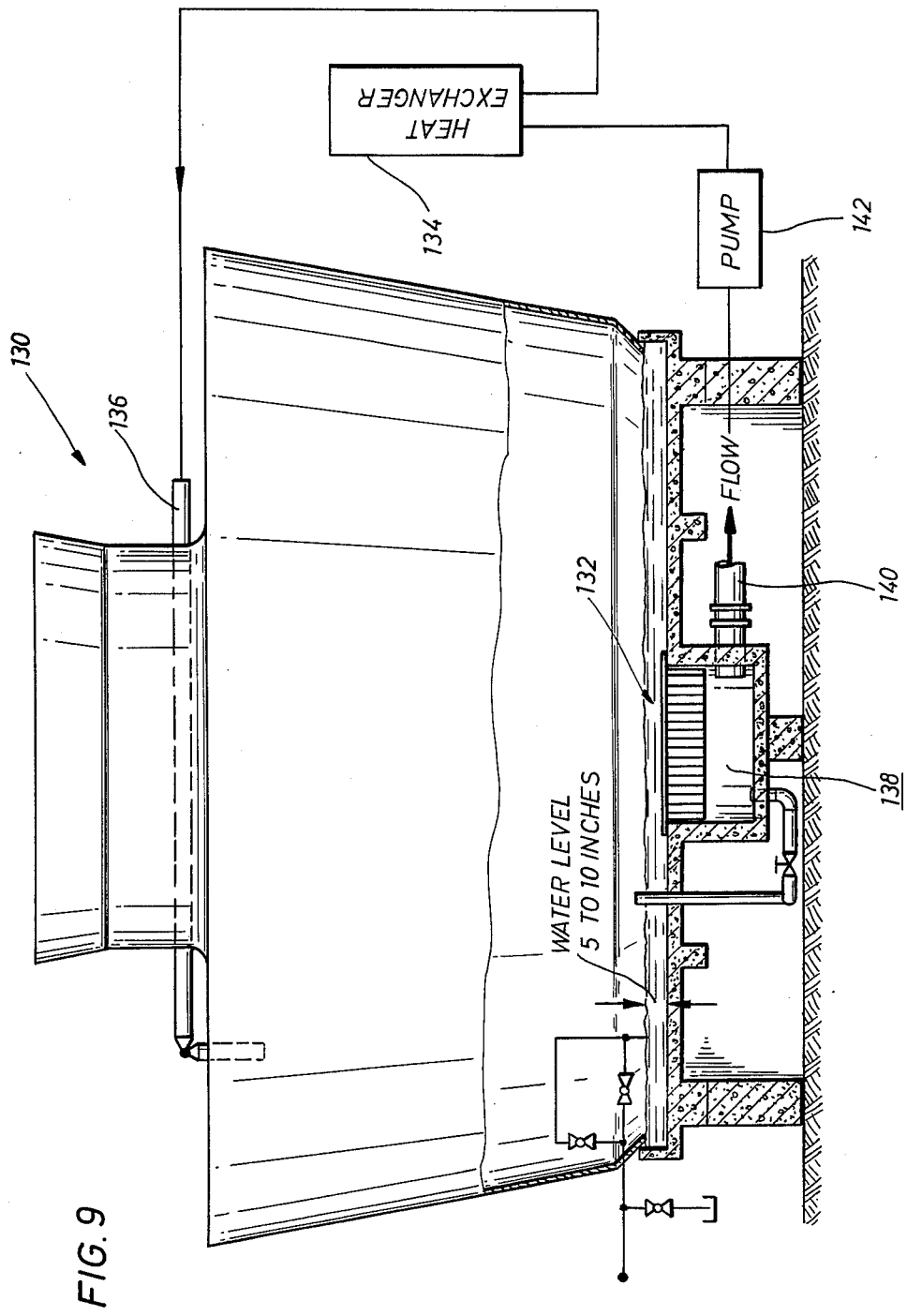

ELECTRONIC WATER TREATMENT APPARATUS

BACKGROUND OF THE INVENTION

This invention relates to a fluid treatment apparatus for scale removal in circulating fluid systems, and more specifically to an electronic fluid treatment apparatus having parallel metal planar electrodes to modify the electrical charge on any minerals within the fluid.

Circulating fluid systems as for example, water heaters, boilers and heat exchangers using fresh water supplies often encounter a problem with encrustation or scaling due to mineral deposits. Fresh water supplies normally contain a relatively large amount of minerals which separate from the fluid to form a crystallized compound. Since many of the minerals found in this scale have inverted solubility curves, that is their solubility decreases as the temperature rises, hot water circulating systems are especially endangered by scale depositing. The more common minerals that cause economic loss due to scale deposits are calcium and magnesium sulfate and calcium and magnesium carbonate.

There have been many theories propounded concerning scale formation, scale removal and scale control as well as an equal number of devices and methods for treating the same. Electrical devices for treatment of moving fluid have been known for many years and have met with varying success. In theory scale formation proceeds by the deposition of crystalline material about scattered micronuclei as the constituent ions arrange themselves in the growing compound in a definite geometric pattern. The resulting crystal has a definite internal structure and an outward form bounded by charged planes. Scale may form on the surfaces in contact with the water if the atomic particles are allowed to form a latice structure or unit cell which may take on a repetitive three dimension form. The binding forces keeping the crystal in contact are electrostatic between the ions present. Any chemical or electrical device that interferes with the building of the crystalline matrix will prevent formation of an integrated solid deposit of scale, although it will not normally prevent the precipitation of the minerals from the water.

To date methods and devices that have been proposed to solve the scaling problem fall into two categories: chemical and electrical. Chemical treatment has been used for many years to assist in controlling scale in water systems. Certain chemicals such as the molecularly dehydrated phosphates or certain organic substances of the natural or synthetic organic polymer types are able to modify the charges along the faces of the micronuclei and prevent the formation of sufficiently large crystalline structures that would preclude normal heat transfer. Chemical treatment is costly and has been found in some instances to be ineffective. Further, the pollution associated with chemical discharge have provided a demand for new solutions to the problems of scaling in the water systems.

The second category of methods and devices for controlling scaling in water systems, that is, the electrical devices, may be further categorized into electrostatic, electromagnetic, electrophoretic and electronic. All these devices are attempting to interfere with the formation of mineral incrustation by use of electricity.

Electrostatic water treatment devices such as the device disclosed in U.S. Pat. No. 4,073,712, entitled "Electrostatic Water Treatment" by Means et al provide an electrostatic field across an anode and cathode by placing a high voltage across electrodes which are insulated from each other and from the water itself. A limitation in this type of device is in the strict thickness requirement of the insulation used to protect the electrodes from the water. Any increase in size in the anode or cathode of the structure is limited due to the higher voltage requirements and critical insulation thickness on a larger area.

Electromagnetic water treatment devices utilize a permanent or electronmagnet to generate a magnetic field to accomplish a similar result as the electrostatic field described above. A limitation in increasing the size of an electromagnetic water treatment device for greater area exposure is the power requirements to generate the magnetic field which may be 10 amps or more.

An electrophoretic water treatment system utilizes dissimilar metals to simulate a galvanic cell which attracks particles to oppositely charged electrodes.

In an electronic water treatment apparatus, an electric field is generated between oppositely charged electrodes by using a low voltage DC power supply. Further, the electrodes although insulated from each other are not insulated from the fluid itself. An example of an electronic water treating apparatus used in a pressurized water circulating system is manufactured by Hydrotreat, Inc., Houston, Tex., assignee of the present invention. The Hydrotreat water treater consists of a barrel in which the selected electronic signals are introduced into the system and an electronic assembly by which the signals are generated. An electrode at the center of the barrel is in direct electrical contact with the system water and is electrically insulated from the outer cylinder of the barrel. The electronic signals are supplied to the center electrode which serves as the anode. The outer cylinder is also in direct electrical contact with system water and is at electrical ground and serves as the cathode. The water is treated electronically as it flows between the center anode and the outer cathode.

All of the above types of water treatment devices have positive effects on the interference of crystaline formation, which results in precipitation of minerals downstream. However, due to the limitations presented above concerning the electrostatic, the electromagnetic, and electrophoretic devices, greater efficiencies may not be obtained by substantially increasing the surface area of the electrodes used in those systems. Further, in all of the above devices including the electronic device, the inherent problem of installation within the piping system requires shutdown of the circulating water system as well as costly modification of the piping.

SUMMARY OF THE INVENTION

An electronic fluid treatment device is provided in accordance with the present invention that overcomes the problems of shutdown of the circulating fluid system upon installation and cleaning of the device. The present invention further enhances the effectiveness of fluid treatment by increasing the electrode area, providing an increased electric field exposure to the fluid within the system.

The electronic fluid treatment apparatus of the instant invention includes a support member having a plurality of planar electrodes disposed thereon. A low voltage DC pulsating power supply is provided to induce opposite charges on alternate electrodes thereby generating an electric field between adjacent electrodes for interaction with the fluid as it flows through the device. The planar electrodes are insulated from each other, however, the electrodes remain in direct contact with the fluid in the system. With this design both the positively charged electrode, the anode, and the negatively charged electrode, the cathode, are equally exposed to the fluid providing a uniform electric field.

One embodiment of the electronic fluid treatment device in accordance with the present invention includes parallel metal plate electrodes disposed on a support structure so as to be parallel to the fluid flow. The structural design may be such that the grounded plates or cathodes are on the outermost edge of the device between two insulating support members. A multi-port device is also provided using at least one power supply to generate an electric field between parallel plate electrodes in at least two fluid treatment devices located in opposed relationship to one another to treat fluid flowing in opposite directions. Further, in an alternate embodiment a flange may be provided to each of the support members to enable use of the device over a recessed area.

A further alternate embodiment of an electronic fluid treatment device in accordance with the present invention includes a support member having a plurality of electrodes disposed thereon located in a longitudinal relationship to the fluid flow. In this instance the planar electrodes are in the form of screen mesh metal sheets, expanded metal sheets, or perforated metal sheets. Use of the apertured electrodes enables acceptance of fluid from all sides.

Also provided is a baffled electrode configuration located on a support member to allow for fluid flow in multiple directions. Yet another embodiment is an electronic fluid treatment device to be used in a pressurized system having a rectangular conduit to support the planar electrodes disposed within the conduit, parallel to the fluid flow or longitudinal therewith.

A water circulating system is further disclosed having a water cooling tower or fluid storage tank connected to inlet and outlet ports for circulating the fluid. The system includes an electronic fluid treatment apparatus having parallel planar electrodes or baffled electrodes for maximum exposure of the fluid to an electric field thereby modifying the mineral particles within the fluid for reducing scale formation through precipitation further downstream in the system.

BRIEF DESCRIPTION OF THE DRAWINGS

FIG. 4 is a diagrammatic view of a multiple port fluid treatment apparatus in accordance with the present invention;

FIG. 4A is a top view of a tower basin utilizing a multiple port fluid treatment apparatus in accordance with the present invention.

FIG. 5A is a top view of a tower basin utilizing an electronic fluid treatment apparatus for use over a recessed area as in accordance with the present invention;

FIG. 9 is a cross sectional view of a rectangular conduit having parallel plate electrodes in accordance with the present invention.

DETAILED DESCRIPTION OF THE DRAWINGS

The electronic fluid treatment apparatus of the present invention is utilized to prevent the build up of scale on the internal walls of water pipes, water heaters, heat exchangers, and other water circulating systems by electrically charging the minerals contained in the water so they are prevented from attaching themselves to each other or to the internal walls. The design of the fluid treating device in accordance with the present invention enables installation within the pressurized portion of a water circulating system or the open water portion as, for example, the cooling tower basin or tank. Placement in the open water portion of the system reduces downtime of the water circulating system and facilitates installation without interruption in operation and without costly modification of the system piping.

Figure 1A:
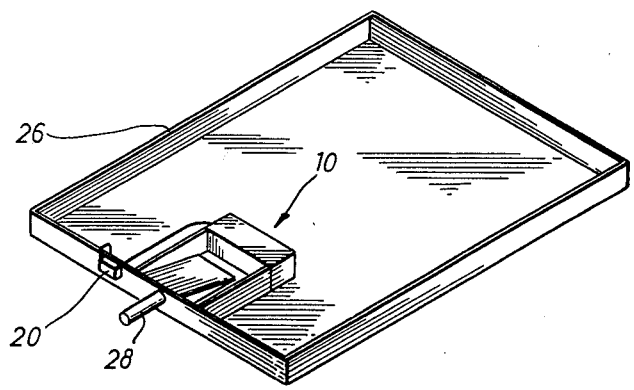
FIG. 1A is a top view of a tower basin having an electronic fluid treating device in accordance with the present invention.
Figure 1:
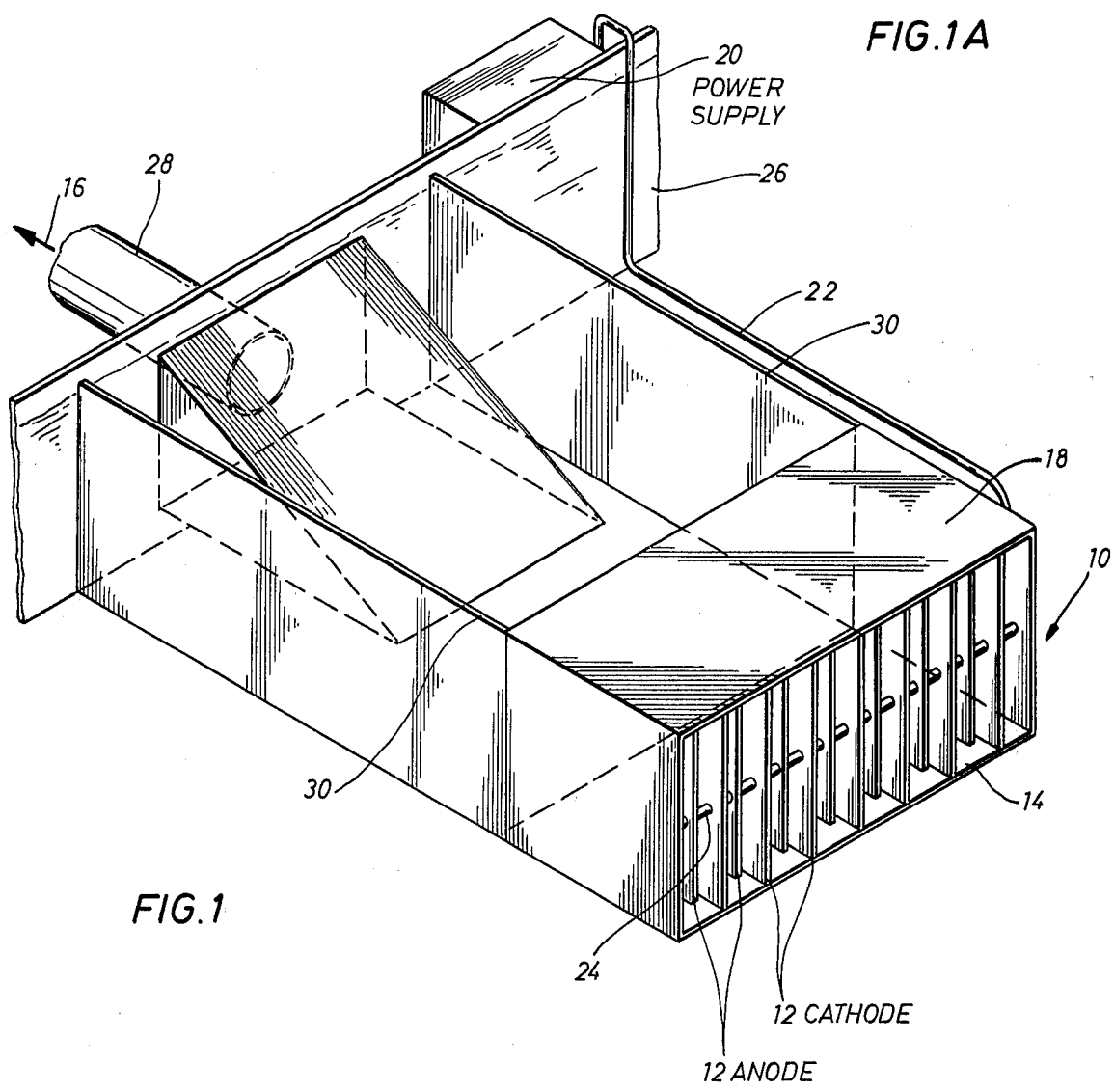
FIG. 1 is a diagrammatic view of an electronic fluid treatment device connected to an inlet port of a circulating water system.

Referring now to the drawings and more particularly to FIGS. 1 and 1A, an electronic fluid treatment device 10 is illustrated. The fluid treatment device 10 in FIG. 1 includes a series of parallel metal plate electrodes 12 disposed on a support member 14. The support member 14 comprises a dielectric insulating material, as polyethylene for example. The metal plates 12 are arranged in adjacent relationship so as to be parallel to the flow of fluid in a direction 16. A further insulating support member 18 may be provided to substantially enclose the metal plate electrodes 12. A charging power supply 20 is electrically connected to the series of metal plate electrodes 12 by way of a conductor 22. This electrical connection to the metal plate electrodes 12 is such that alternating electrodes have a positive charge with the remaining electrodes at earth ground level. Thus, the outermost electrode, is normally grounded for protection for the user, and may be designated a cathode. The adjacent electrode may be designated an anode and receives a direct electrical pulse. The charging power supply comprises a pulsating DC power supply which induces a low voltage potential across the electrodes 12. Although the individual metal plate electrodes 12 are insulated from each other by insulators 14 and 24, also a dielectric insulating material, the metal plate electrodes 12 are not insulated from the fluid flowing through the device 10. Thus, an electric field is generated by the power supply 20 such that a voltage potential of from 0.7 to 10 volts, for example, is induced across the fluid causing electrical current to flow through the fluid.

The fluid treatment device 10 is utilized in a circulating water system partially shown in FIG. 1A where a cooling tower basin 26 has an outlet port 28 for discharging treated fluid. Means for guiding the flow of the fluid through the treatment device 10 is also provided in the form of plates 30 having a height above the fluid level so as to direct the fluid flow through the metal plate electrodes 12.

Further, in the embodiment 10 of FIG. 1 the addition of an apertured electrode between support members 14 and 18 located perpendicular to the electrodes 12 will enhance the electric field intensity between electrodes.

Figure 2:
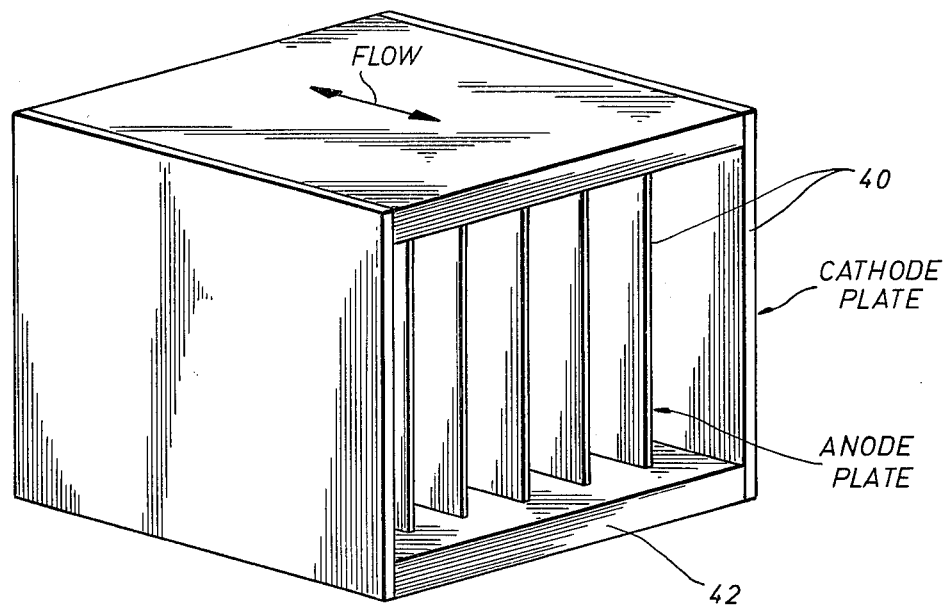
FIG. 2 is a diagrammatic view of an electronic fluid treating device utilizing metal plate planar electrodes in accordance with the present invention.
Figure 3:
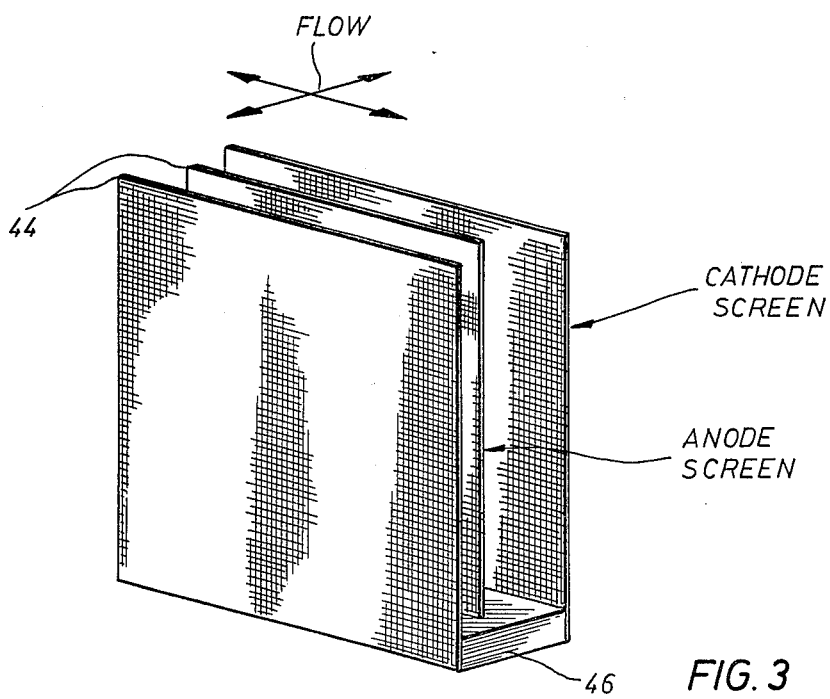
FIG. 3 is a diagrammatic view of screen mesh metal planar electrodes utilized in an electronic fluid treating apparatus.

FIGS. 2 and 3 illustrate a variety of electrode configurations to be utilized in the fluid treatment apparatus 10 shown in FIG. 1. FIG. 2 demonstrates the electrodes in a metal plate or metal sheet form. The metal sheets 40 are located on a support member 42 in parallel relationship to one another. This configuration enabled a maximum electric field exposure to the fluid since a greater electrode area is involved in comparisons to the prior electronic systems where the cathode casing had a much greater surface area than the tubular anode structure. FIG. 3 demonstrates the use of a screen metal mesh electrode 44 disposed on a support member 46 so as to be in opposition to the fluid flow. This configuration allows the fluid to flow through the electrode for an even greater exposure to the electric field generated since the field intensity increases near the electrode. Also, use of apertured electrodes enables fluid flow through the device 10 in multiple directions. A metal used in fabricating the plate electrodes 40 found in FIG. 2 and the screen mesh electrodes 44 found in FIG. 3 as well as expanded metal electrodes or perforated metal electrode also contemplated is stainless steel. Other metals used to fabricate these electrodes are platinum, monel, or titanium, for example. It is understood that the anode and cathode are not required to be made from the same metal. For example, the cathode may be galvanized steel and the anode platinum.

Some water circulating systems provide fluid to a discharge port from multiple directions. A multiple port fluid treatment apparatus 50 is shown in FIG. 4. FIG. 4A illustrates a tower basin 52 providing fluid to a discharge port 54 from a directions 56 and 58. The discharge port 54 is further illustrated in FIG. 4 as being substantially enclosed with a suction scoop 60. A barrier 61 is also provided having a height above the fluid level to prevent fluid from flowing through the discharge port 54 before being treated. Two electronic treatment devices 62 and 64 structurally identical to the apparatus described and illustrated in FIG. 1, but having fewer electrodes, is connected to a power supply 66 providing opposite charges on alternate electrode plates 58 to generate electric fields in each of the respective devices 62 and 64. It will be understood that each device 62 and 64 may have their own power supply. Operationally, the fluid will flow in the direction 56 and 58 into the fluid treatment devices 62 and 64, respectively. Thereafter the fluid flows into the barrier 60 to be finally discharged through discharge port 54. Thus, within the tower basin 52 a maximum amount of fluid will be exposed to the electric fields generated by the multiple port fluid treatment device 50. As in the one port fluid treatment device 10 illustrated in FIG. 1 and described above, the power supply 66 in the multiple port device shown in FIG. 4 is located external to the tower basin and electrically connected to the electrodes 68 by way of an insulated conductor 70.

Figure 5:
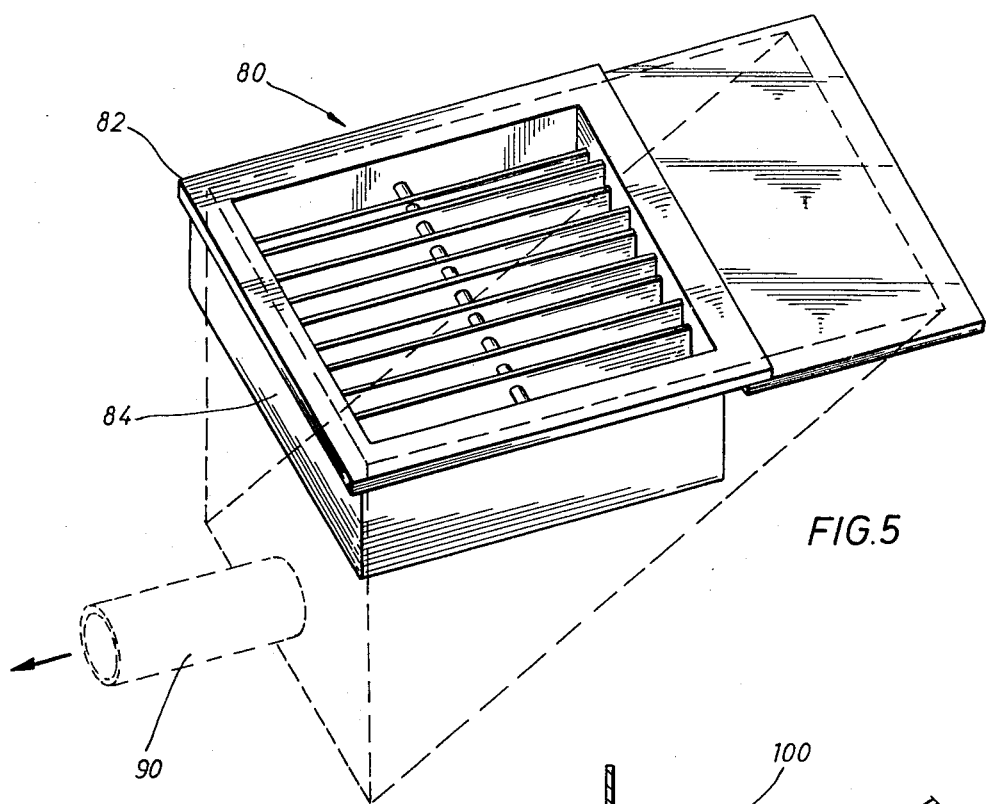
FIG. 5 is a diagrammatic view of an electronic fluid treatment apparatus for use above a recessed area in accordance with the present invention.

The fluid treatment apparatus illustrated in FIG. 5 is substantially similar to the apparatus described and illustrated with respect to FIG. 1. It will be noted however, that the apparatus 80 further contains a rim or flange 82 connected to a support member 84. The flange 82 provides a supporting mechanism to hold the device 80 in place over a recessed area. Referring now to FIG. 5A a cooling tower basin 86 is illustrated having the device 80 inserted in the floor 88 of the tower basin 86. In this water circulating system, the fluid flows through the grate-like structure 80 into a discharge reservoir and out of a discharge port 90. It will be understood that the electrode configuration of the fluid treatment apparatus 80 illustrated in FIG. 5 may be altered so as to rotate the electrodes 90° to be opposed to the fluid flow, while further altering the electrode elements themselves to be either a screen mesh as shown in FIG. 3 or a perforated or expanded metal.

Figure 6A:
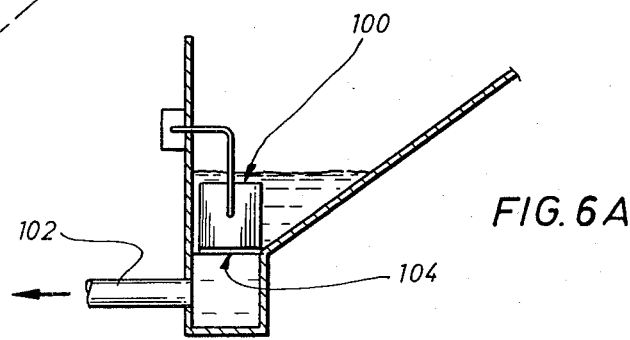
FIG. 6A is a partial side view of a tower basin utilizing an electronic fluid treatment apparatus in accordance with the present invention.
Figure 6B:
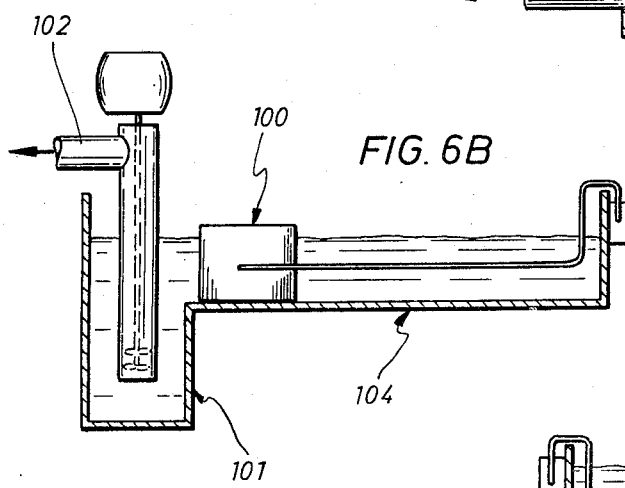
FIG. 6B is a partial side view of a tower basin having pumping capabilities utilizing an electronic water fluid treatment apparatus in accordance with the present invention.
Figure 6C:
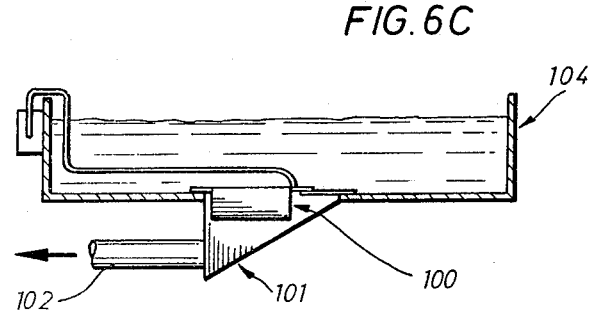
FIG. 6C is a partial side view of a tower basin utilizing an electronic fluid treatment apparatus for use over recessed areas in accordance with the present invention.

FIGS. 6A–6C illustrate a fluid treatment apparatus 100 in accordance with the present invention utilizing parallel electrodes to generate an electric field for scale control. In each of the FIGS. 6A–6C the fluid is circulated in the system through the treater 100. FIG. 6A illustrates a treater device 100 positioned in a sump 101 whereas the water is pulled through discharge port 102. FIG. 6B demonstrates the fluid pumped from a sump 101 thus pulling the fluid through the treater 100 and out discharge port 102. In each of the systems shown in FIGS. 6A and 6B the embodiment shown in FIG. 1 using metal plate electrodes or apertured metal electrodes will operate to electrically modify minerals in the fluid for downstream precipitation. FIG. 6C shows the treater device 100 in the floor of the tower basin 104 where fluid passes through the treater 100 and out of discharge port 102.

Figure 7:
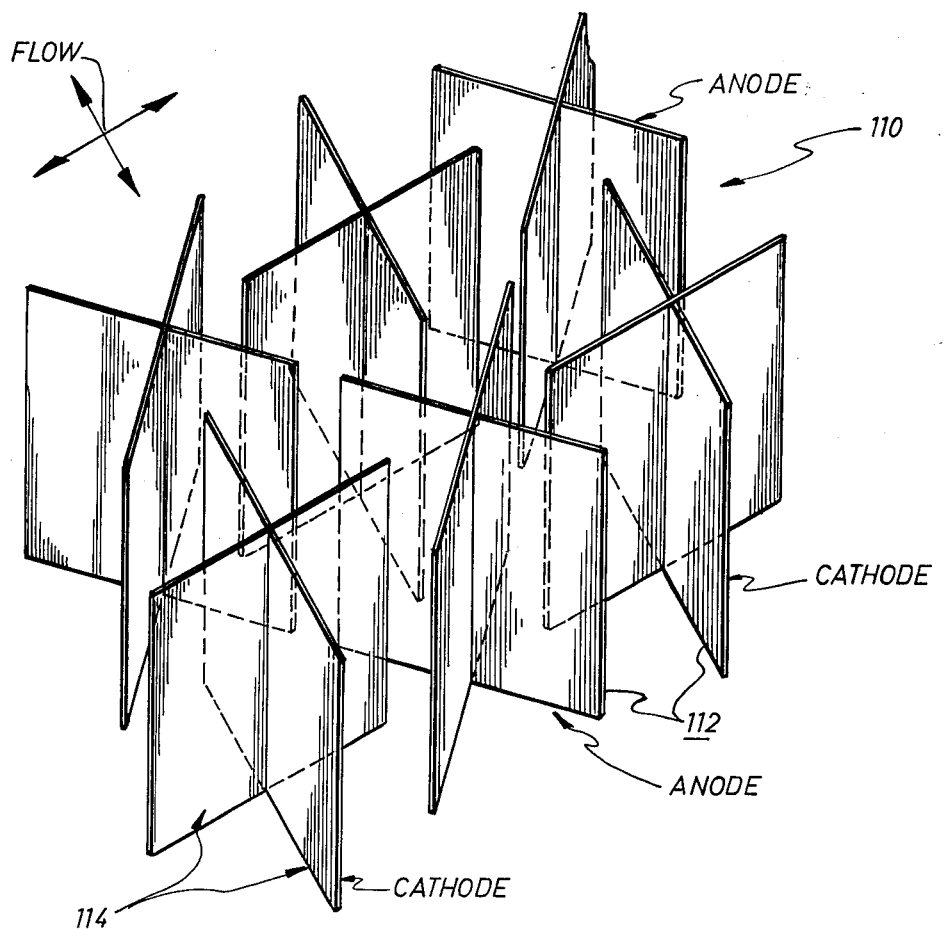
FIG. 7 is a diagrammatic view of interspaced planar electrodes utilized for multi directional flow of fluid in accordance with the present invention.

In many cooling tower systems or other open water systems the discharge port is not accessible and placement of any type of water treatment device adjacent to the discharge port is a difficult task. The electrode configuration 110 illustrated in FIG. 7 when used in accordance with the present invention, enables treatment of fluid flowing in multiple directions in an open area of a cooling tower basin or tank. A water treatment device utilizing the electrode configuration 110 may be placed anywhere in the basin of a cooling tower for example, away from the discharge port and efficiently electrically treat the fluid.

The electrode configuration 110 includes a plurality of positive and negative electrodes 112. Both the positive and negative electrodes 112 have intersecting planar electrode members 114. The electrodes 112 are located on a support member so as to be in interspaced relationship to one another. By applying a DC power supply to alternate electrodes 112, such that adjacent electrodes are oppositely charged, will induce an electric field between adjacent electrode members 112. Due to the baffled design of the electrode structure 110, fluid flowing through a device utilizing this configuration will experience a weak field upon entry between members 114 of the electrodes 112. However, where the members 114 of alternate electrode structures 112 are in close proximity to one another, fluid flow will experience an intense electric field, achieving the same results as planar electrodes with similar surface areas.

Figure 8:
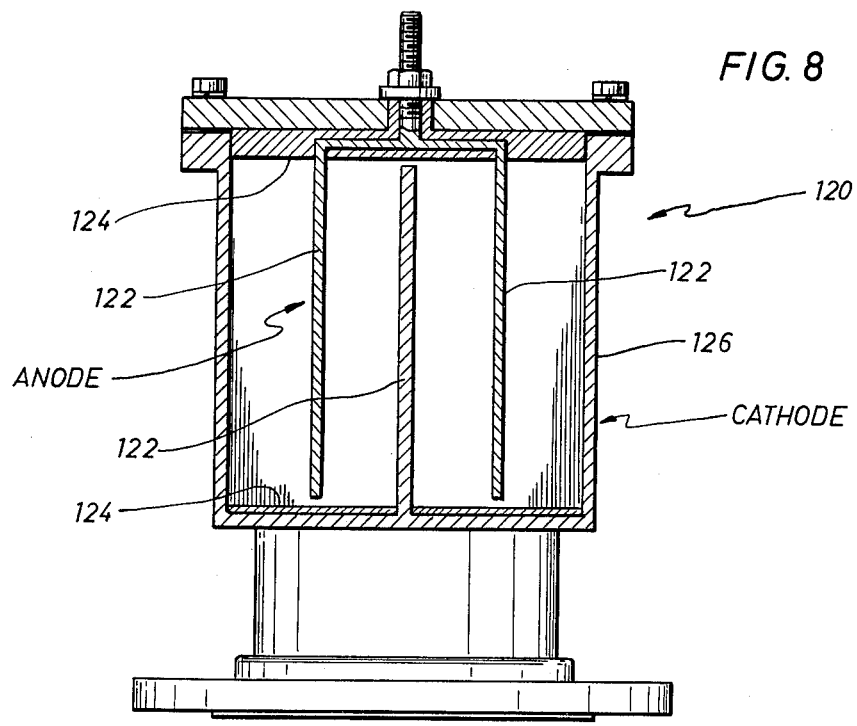
FIG. 8 is a water cooling system utilizing the electronic fluid treatment apparatus illustrated in FIG. 5 in accordance with the present invention.

FIG. 8 illustrates a cross sectional view of a rectangular conduit 120 having parallel plate electrodes 122 in accordance with the present invention. In many water treating systems there is no provision for an open water system as a cooling tower or water storage tank, for example. In these systems it is necessary to utilize a pressurized water treating apparatus. For this purpose an electronic water treating apparatus in accordance with the present invention may comprise a rectangular conduit 120 having a series of parallel electrodes 122 electrically connected to a DC power supply to effect an electric field between adjacent electrodes. Those electrodes 122 designated with a positive electrical charge must be insulated from the oppositely charged electrodes 122. A dielectric material 124 is provided to perform this insulating function. In the embodiment shown in FIG. 8 the rectangular conduit housing 126 is utilized as a negatively charged electrode, that is grounded to the earth. If a parallel electrode configuration located in a rectangular conduit opposite to the flow of the fluid is desired, the metal plate electrode structure shown in FIG. 8 must be replaced with an apertured electrode structure as illustrated in FIG. 3 and described above. Further, longitudinal placement of the electrode structures will necessitate lining the conduit casing at least in those areas exposed to the positively charged electrodes 122.

FIG. 9 illustrates a water cooling system utilizing a fluid treatment device in accordance with the present invention. In the water cooling system 130, water is provided from a heat exchanger 134 through inlet port 136 to be accumulated in the basin of the cooling system 130. Water circulating in the basin of the cooling system 130 will circulate through the fluid treatment device 132 in a manner described above in relation to FIGS. 1 and 4. The water will then accumulate in sump 138 before being discharged through discharge port 140. The fluid is then pumped by pumping unit 142 to the heat exchanger 134 where the cycle will repeat.

While the invention has been described and illustrated with respect to specific embodiments, it will be understood that other embodiments and modifications in accordance with the spirit and scope of the invention are contemplated.

What is claimed is:

1. An electronic fluid treatment apparatus for scale control for use in freely circulating fluid reservoirs comprising:
   an open ended support having at least one planar surface;
   means for supporting an electric field having a potential voltage greater than 0.7 volts including:
      a first plurality of planar electrodes having a positive electrical charge, vertically disposed on said surface in spaced parallel relationship to one another, and,
      a second plurality of planar electrodes having a negative electrical charge, vertically disposed on said surface in alternating spaced parallel relationship with said first plurality of planar electrodes and electrically insulated therefrom,
      said first and second plurality of planar electrodes being in direct electrical contact with said fluid; and,
      a power supply electronically connected to said first and second plurality of electrodes for generating said electric field between each of said alternating first and second planar electrodes.

2. An electronic fluid treatment apparatus as set forth in claim 1 wherein said support comprises first and second planar surfaces located in spaced parallel relationship to one another, wherein said first and second plurality of planar electrodes are located between said first and second planar surfaces.

3. A fluid treatment apparatus as set forth in claim 1 wherein said at least one planar surface comprises a dielectric insulating material.

4. A fluid treatment apparatus as set forth in claim 1 wherein said first and second plurality of planar electrodes comprise metal plates.

5. A fluid treatment apparatus as set forth in claim 4 wherein said metal is platinum.

6. A fluid treatment apparatus as set forth in claim 4 wherein said metal is stainless steel.

7. A fluid treatment apparatus as set forth in claim 4 wherein said metal is titanium.

8. A fluid treatment apparatus as set forth in claim 4 wherein said metal is monel.

9. A fluid treatment apparatus as set forth in claim 1 wherein each of said first and second plurality of planar electrodes comprise a perforated metal sheet.

10. A fluid treatment apparatus as set forth in claim 1 wherein each of said first and second plurality of planar electrodes comprise a screen mesh metal sheet.

11. A fluid treatment apparatus as set forth in claim 1 wherein each of said first and second plurality of planar electrodes comprise a sheet of expanded metal.

12. A fluid treatment apparatus as set forth in claim 1 wherein each of said first and second plurality of planar electrodes are electrically insulated from one another by a dielectric insulating material.

13. A fluid treatment apparatus as set forth in claim 1 wherein said power supply is a pulsating DC power supply.

14. An electronic fluid treatment apparatus for scale control for use in freely circulating fluid reservoirs comprising:
   an open ended support having at least one planar surface;
   means for supporting an electric field having a potential voltage greater than 0.7 volts including:
      a first plurality of planar electrodes having a positive electrical charge, vertically disposed on said surface in spaced parallel relationship to one another, and,
      a second plurality of planar electrodes having a negative electrical charge, vertically disposed on said surface in alternating spaced parallel relationship with said first plurality of planar electrodes and electrically insulated therefrom;
      said first and second plurality of planar electrodes located on said support member parallel to the direction of flow of said circulating fluid,
      said first and second plurality electrodes being in electrical contact with said fluid; and,
      a power supply for generating said electric field between each of said alternating first and second plurality of electrodes.

15. An electronic fluid treatment apparatus as set forth in claim 14 wherein each of said first and second plurality of electrodes comprise apertured planar metal electrodes for providing multi-directional fluid treatment.

16. An electronic fluid treatment apparatus as set forth in claim 14 wherein said support comprises first and second planar surfaces located in spaced parallel relationship to one another, wherein said first and second plurality of planar electrodes are located between said first and second planar surfaces.

17. An electronic fluid treatment apparatus as set forth in claim 16 further including an apertured metal electrode attached to the edge of said first and second planar surfaces so as to be perpendicular with said first and second plurality of electrodes.

18. An electronic fluid treatment apparatus as set forth in claim 14, further including a flange extending from at least one planar surface for supporting said device over a recessed area.

19. An electronic fluid treatment apparatus as set forth in claim 16 wherein said first and second plurality of electrodes comprise metal plates.

20. An electronic apparatus for fluid treatment as set forth in claim 19 wherein said metal is stainless steel.

21. An electronic fluid treatment apparatus as set forth in claim 19 wherein said metal is platinum.

22. An electronic fluid treatment apparatus as set forth in claim 19 wherein said metal is titanium.

23. An electronic fluid treatment apparatus for scale control for use in freely circulating fluid reservoirs comprising:
an open ended support having at least one planar surface;
means for supporting an electric field having a potential voltage greater than 0.7 volts including:
a first plurality of planar electrodes having a positive electrical charge, vertically disposed on said surface in spaced parallel relationship to one another, and,
a second plurality of planar electrodes having a negative electrical charge, vertically disposed on said surface in alternating spaced parallel relationship with said first plurality of planar electrodes and electrically insulated therefrom,
said first and second plurality of electrodes located on said support member in a longitudinal manner against fluid flow,
said first and second plurality of electrodes being in electrical contact with said fluid; and,
a power supply for generating said electric field between each of said alternating first and second plurality of electrodes.

24. An electronic fluid treatment apparatus as set forth in claim 23 wherein said first and second plurality of electrodes comprise a screen metal mesh.

25. An electronic fluid treatment apparatus as set forth in claim 23 wherein said first and second plurality of electrodes comprise a perforated metal sheet.

26. An electronic fluid treatment apparatus as set forth in claim 23 wherein said first and second plurality of electrodes comprise a sheet of expanded metal.

27. An electronic fluid treatment apparatus as set forth in claim 23 wherein said support comprises first and second planar surfaces located in spaced parallel relationship to one another, wherein said first and second plurality of planar electrodes are located between said first and second planar surfaces.

28. An electronic fluid treatment apparatus as set forth in claim 23 further including a flange extending from at least one planar surface for supporting the device over a recessed area.

29. An electronic fluid treatment apparatus as set forth in claim 23 wherein said at least one planar surface comprises a dielectric insulating material.

30. An electronic fluid treatment system for scale control in freely circulating fluid reservoirs comprising: a plurality of electronic fluid treatment devices each having an open ended support having at least one planar surface, means for supporting an electric field having a potential voltage greater than 0.7 volts including: a first and second plurality of planar electrodes oppositely charged and located on said support in alternating spaced parallel relationship to one another, said first and second plurality of electrodes being in electrical contact with said fluid; and at least one power supply having conductors electrically connecting each of said first plurality of electrodes to one another, and each of said second plurality to one another, so as to generate said electric field between each of said alternating first and second plurality of said electrodes.

31. An electronic fluid treatment apparatus for scale control for use in freely circulating reservoir systems having fluid flowing in multiple directions comprising:
an open ended support having at least one planar surface;
means for supporting an electric field having a potential voltage greater than 0.7 volts including:
a first plurality of intersecting planar electrodes disposed on said at least one planar surface having a positive electrical charge, and,
a second plurality of intersecting planar electrodes disposed on said at least one planar surface in interspaced relationship with said first plurality of said electrodes, and insulated therefrom,
said first and second plurality of electrodes being in electrical contact with said fluid, and,
a power supply electrically connecting each of said first plurality of said electrodes to one another and each of said second plurality of electrodes to one another so as to generate said electric field between each of said interspaced first and second plurality of electrodes.

32. An electronic fluid treatment apparatus as set forth in claim 31 wherein said first and second plurality of electrodes comprise apertured metal sheets.

33. An electronic fluid treatment apparatus as set forth in claim 31 wherein said first and second plurality of electrodes comprise metal plates.

34. Apparatus for fluid treatment in a freely circulating reservoir comprising:
a support having at least one planar surface;
means for supporting an electric field having a potential voltage greater than 0.7 volts including:
a plurality of planar electrodes vertically disposed on said at least one planar surface in spaced parallel relationship to one another wherein said alternating electrodes having positive and negative charges respectively; and,
a power supply electrically connected to said plurality of said electrodes for generating said electric field between each of said alternating electrodes.

* * * * *

UNITED STATES PATENT AND TRADEMARK OFFICE
CERTIFICATE OF CORRECTION

PATENT NO. : 4,235,698

DATED : November 25, 1980

INVENTOR(S) : Johnny Arnaud

It is certified that error appears in the above-identified patent and that said Letters Patent are hereby corrected as shown below:

Column 2, lines 18-19, change "attracks" to --attracts--.

Column 7, line 67, change "electronically" to --electrically--.

Column 9, line 17, change "claim 16" to --claim 14--.

Column 10, line 37, change "fluid," to --fluid;--.

Signed and Sealed this

Twenty-first Day of July 1981

[SEAL]

Attest:

Attesting Officer

GERALD J. MOSSINGHOFF

Commissioner of Patents and Trademarks